United States Patent [19]

Rosenberg

[11] Patent Number: 5,245,679
[45] Date of Patent: Sep. 14, 1993

[54] DATA FIELD IMAGE COMPRESSION

[75] Inventor: Charles J. Rosenberg, Cambridge, Mass.

[73] Assignee: Hewlett-Packard Company, Palo Alto, Calif.

[21] Appl. No.: 829,548

[22] Filed: Feb. 4, 1992

Related U.S. Application Data

[63] Continuation of Ser. No. 521,949, May 11, 1990.

[51] Int. Cl.[5] .......................... G06K 9/36; G06K 9/46
[52] U.S. Cl. ........................................ 382/56; 358/426
[58] Field of Search ................... 382/56, 22, 21, 25; 358/426, 433, 445, 455, 138

[56] References Cited

U.S. PATENT DOCUMENTS

| | | | |
|---|---|---|---|
| 4,199,815 | 4/1980 | Kyte et al. | 382/56 |
| 4,513,444 | 4/1985 | Okai et al. | 382/56 |
| 4,542,412 | 9/1985 | Fuse et al. | 382/56 |
| 4,700,402 | 10/1987 | Okai et al. | 382/21 |
| 4,718,103 | 1/1988 | Shojima et al. | 382/21 |
| 4,783,829 | 11/1988 | Miyakawa et al. | 382/22 |
| 4,791,486 | 12/1988 | Spriggs et al. | 358/138 |
| 4,932,066 | 6/1990 | Nakayama et al. | 382/56 |
| 4,969,201 | 11/1990 | Takasaki et al. | 382/22 |
| 4,975,853 | 12/1990 | Shimizu et al. | 382/22 |

*Primary Examiner*—David K. Moore
*Assistant Examiner*—David Fox

[57] ABSTRACT

A novel lossy image compression algorithm—nonuniform sampling and interpolation, or NSI—for fast uncompression on a low power compute platform is disclosed. Decoder simplicity is traded off for a slight (2.5 dB) signal to noise ratio degradation over a non-adaptive discrete cosine transform (DCT) and increased encoder complexity. Encoding is three times slower than the DCT. High quality images are obtained at compression rates as high as 8:1 for 8 bit per pixel greyscale images. NSI can uncompress an image 48 times faster than a DCT. This speed advantage is traded for a small degradation in quality and higher compressing complexity. However, the characteristics of NSI make it ideal for use in an application (a) where images are more often uncompressed than compressed and (b) where a PC will be decompressing the image without expensive hardware assistance.

8 Claims, 12 Drawing Sheets

DATA FIELD IMAGE COMPRESSION

This application is a continuation of application Ser. No. 07/521,949, filed May 11, 1990.

BACKGROUND OF THE INVENTION

Field of the Invention

This invention relates generally to algorithms for generating data samples representative of a data field, compressing (also known as encoding) the data samples for efficient storage in a memory such as a computer memory, and then retrieving the data samples by decompressing (decoding) them to represent a facsimile of the data field.

More particularly this invention relates to algorithms for taking data samples representative of images such as a picture or printed language character, compressing the data samples for efficient storage in a small area of computer memory, and decompressing the data samples to reproduce a likeness of the images.

Current State of the Technical Art

Introduction

Various algorithms now exist for storing a visual image—such as pictures and fonts representing numbers and alphabetic characters—as data in a memory, for example in a computer memory. The stored data can be retrieved and processed to re-create a paper or screen-displayed copy of the visual images.

An example of a typical process is an image scanner coupled to a computer. An image, for example a photograph or a paper page of text consisting of font characters, can be scanned by an electrooptical scanner coupled to a computer comprising hardware and software. The scanner periodically samples the image and produces a packet of raw or uncompressed sample data corresponding to the image.

The sample data, if stored in its uncompressed form, will take up a certain amount of memory space—usually in the form of mass storage space such as a hard disk—within the computer. However, people skilled in this technology have found that by compressing the originally uncompressed data, much less mass storage space is required for storing the data. Therefore, it is now common practice to compress the sampled data prior to storing it in memory.

To produce a copy of the image, the computer retrieves the compressed data from memory, expands the data into uncompressed data, and then reproduces the uncompressed data in a form that can be seen on a screen or on paper.

Literature

Data compression/decompression techniques are discussed in the literature on the subject. Samples of this literature—and literature which is hereby incorporated by reference into this patent application—appear in the following list:

Bially, Theodore. "Space-Filling Curves: Their Generation and Their Application to Bandwidth Reduction," *IEEE Transactions on Information Theory*, vol. IT-14, no. 6, Nov. 1969, pp. 658-664. (Cited herein as Bially '69)

Davisson, Lee D. "Data Compression Using Straight line Interpolation," *IEEE Transactions on Information Theory*, vol. IT-1 4, no. 3, May 1968, pp. 390-394. (Davisson '68)

Ehrman, L. "Analysis of Some Redundancy Removal Bandwidth Compression Techniques," *Proceedings of the IEEE*, vol. 55, no. 3, Mar. 1967, pp. 278-287. (Ehrman '67)

Gardenhire, Lawrence W., "Redundancy Reduction the Key to Adaptive Telemetry," *Proc. of the 1964 National Telemetering Conference*, 1964 pp. 1-16. (Gardenhire '64)

Hovig, Ingvil. "Image Compression and Coding, with Emphasize on Polygon Based Techniques and Representation," ISCAS '88, pp. 467-470. (Hovig '88)

Kortman, C. M. "Redundancy Reduction—A Practical Method of Data Compression," *Proceeding of the IEEE*, vol. 55, no. 3, Mar. 1967. (Kortman '67)

Lee, Chin-Hwa, "Image Surface Approximation with Irregular Samples," *IEEE Transactions on Pattern Analysis and Machine Intelligence*, vol. 11, no. 2, Feb. 1989, pp. 206-212. (Lee '89)

Makhoul, John, "A Fast Cosine Transform in One and Two Dimensions," IEEE Transactions on Acoustics, Speech, and Signal Processing, vol. ASSIP-28, no. 1, Feb. 1980, pp. 27-34. (Makhoul '80)

Pratt, William K. *Digital Image Processing.* John Wiley and Sons, New York: 1978. (Pratt '78)

Sklansky, Jack; Gonzalez, Victor. "Fast Polygonal Approximation of Digitized Curves," *Pattern Recognition*, vol. 12, 1980, pp. 327-331. (Sklansky and Gonzalez '80)

Wallach, E.; Karnin E. "A Fractal Based Approach to Image Compression," Proceedings ICASSP, vol. 1, 1986, pp. 529-532. (Wallach and Karnin '86)

Data Compression/Decompression Techniques

A class of algorithms which perform "redundancy reduction" on image data exhibit some of the characteristics most desired of data compression approaches. These algorithms treat the greyscale image data as a three dimensional intensity surface. This treatment of the image data is useful in that it collapses the lossy image compression problem to trying to find a data set which represents an approximation to this surface.

One way to obtain such a data set is to nonuniformly sample the surface, taking more samples where the surface is more complex. Early investigations into the nonuniform sampling of image scan line intensity waveforms were performed by Gardenhire '64, Ehrman '67, Kortman '67, and Davisson '68.

These algorithms operated on a line by line basis to decide which samples were redundant and could be discarded. A sample was discarded if it could be interpolated within a specified tolerance from the retained samples. The usual interpolant was a zero order polynomial linear interpolation.

Recent work by Wallach and Karnin '86 is similar. This work is "fractal" in nature because the line lengths and the line slopes are limited to a small number of possibilities.

One treatment of the intensity data as a true three dimensional surface has been completed by Lee '89. In this work, intensity contours in the image are identified. Compressed image data consists of the intensity values and shaped of these contours. A spline based surface reconstruction technique recreates the missing pixels. Similar work involving a polygonal surface segmentation strategy has been performed by Hovig '88.

These techniques usually do not perform as well as transform domain techniques, such as the discrete cosine transform (DCT), in terms of reconstructed image quality for a given compression ratio. However, these algorithms are usually faster to decode because they do not perform the operations necessary to transform the image.

Another common image compression algorithm now in use is block truncation coding (BTC); it exhibits fast decoding and encoding but the resultant image quality is low. A further image compression algorithm is the discrete cosine transform (DCT). The resultant image quality is high but compression and decompression are slow. These and other previously developed compression algorithms fail in at least one of two major respects: (a) either reconstructed image quality is low at high compression rate, or (b) decoder complexity is high.

Therefore, a need continues to exist for further improvements in the speed, accuracy and memory usage associated with data compression, particular for data samples produced from images such as pictures and written language characters.

SUMMARY OF THE INVENTION

According to the present invention, at least a portion of an image that has been scanned to produce an intensity value for each of a collection of sample points is represented in compressed binary form by defining an error criterion and setting an error threshold in terms of the error criterion, and, beginning with an initial sample point in an order of the sample points, determining a selected sample point just preceding a next succeeding sample point that together with said initial sample point defines a line or other curve such that when intermediate sample points are interpolated in accordance with said line or other curve said error threshold is exceeded, else, if said error threshold is not exceeded, identifying a final sample point in said order as said selected sample point. The foregoing process is repeated, identifying the selected sample point as the initial sample point, until the final sample point is identified as the selected sample point. Intensity values of the initial sample point and of only such sample points as have been determined to be selected sample points are then stored in retrievable form.

More particularly, this invention provides a method for quickly and accurately compressing data samples having a memory space storage requirement that is less than memory requirements of convention methods now in use. This inventive method provides two compression approaches with are used in combination: (1) nonuniform sampling and interpolation (NSI), and (2) an improved method of entropy encoding.

This lossy image compression algorithm described here is advantageous in that the decoding complexity is low. This makes it amenable to decompression in software. Another advantage is that the reconstructed image quality is relatively high.

The algorithm investigated and developed in this work is intended for an application where the primary concerns are (1) decoding speed and (2) quality of the decoded image. Encoder speed is a secondary consideration. In an intended application, a compressed image is transmitted to a PC (Personal Computer) for decoding. The image is decoded without the use of special hardware, and serves as a preview of the image or a draft version for page composition. This has resulted in the invention of an algorithm which allows (1) fast decoding and (2) the best achievable image quality possible given the decoder constraints.

This invention algorithm is most similar to algorithms which perform what is commonly called "redundancy reduction". Redundancy reduction algorithms sample the image nonuniformly; more samples are placed in areas of the image which are more complex. These algorithms exhibit fast encoding and decoding; however, image quality is relatively low. In contrast, the inventive algorithm described here brings the quality of the reconstructed image close to the high quality of that of the discrete cosine transform (DCT). In doing so this algorithm method slows down encoding of the data samples but not decoding.

BRIEF DESCRIPTION OF THE DRAWINGS

The present invention can be further understood with reference to the following description in conjunction with the appended drawings. In the drawings.

Figure 6A:
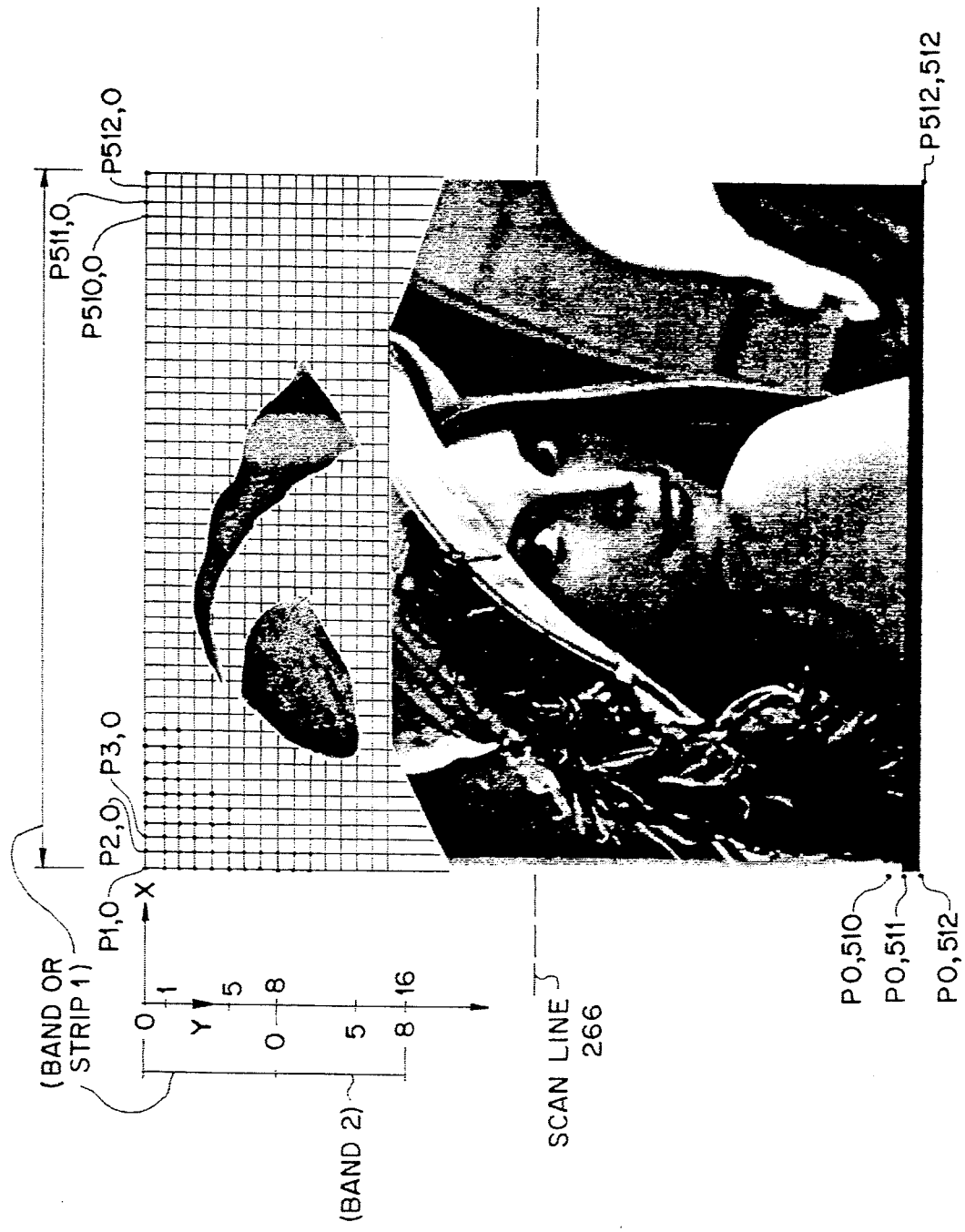
FIG. 6(a) is a photocopy of a computer-generated Lena Image having superimposed on a top portion thereof a scanning grid indicating sample points and indicating selected and non-selected (*interpolated*) sample points when the NSI image compression method of the present invention is applied thereto.
Figure 6B:
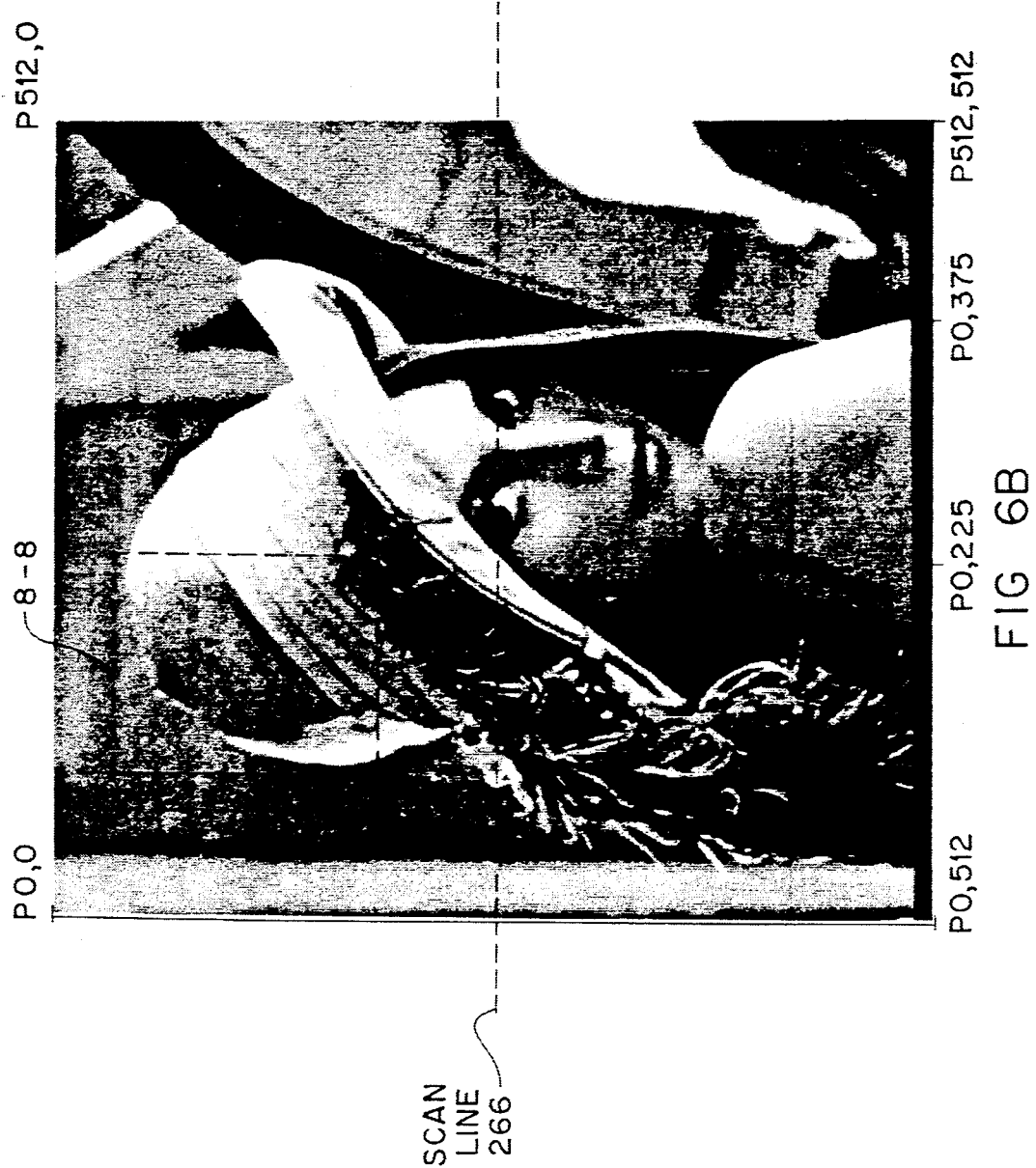
FIG. 6(b) is a photocopy of a computer-generated Lena Image resulting from compression and subsequent decompression, according to the method of the present invention, of the data use to generate the Lena Image of FIG. 6(a)
Figure 8A:
Figure 8B:
Figure 8C:
Figure 9A:
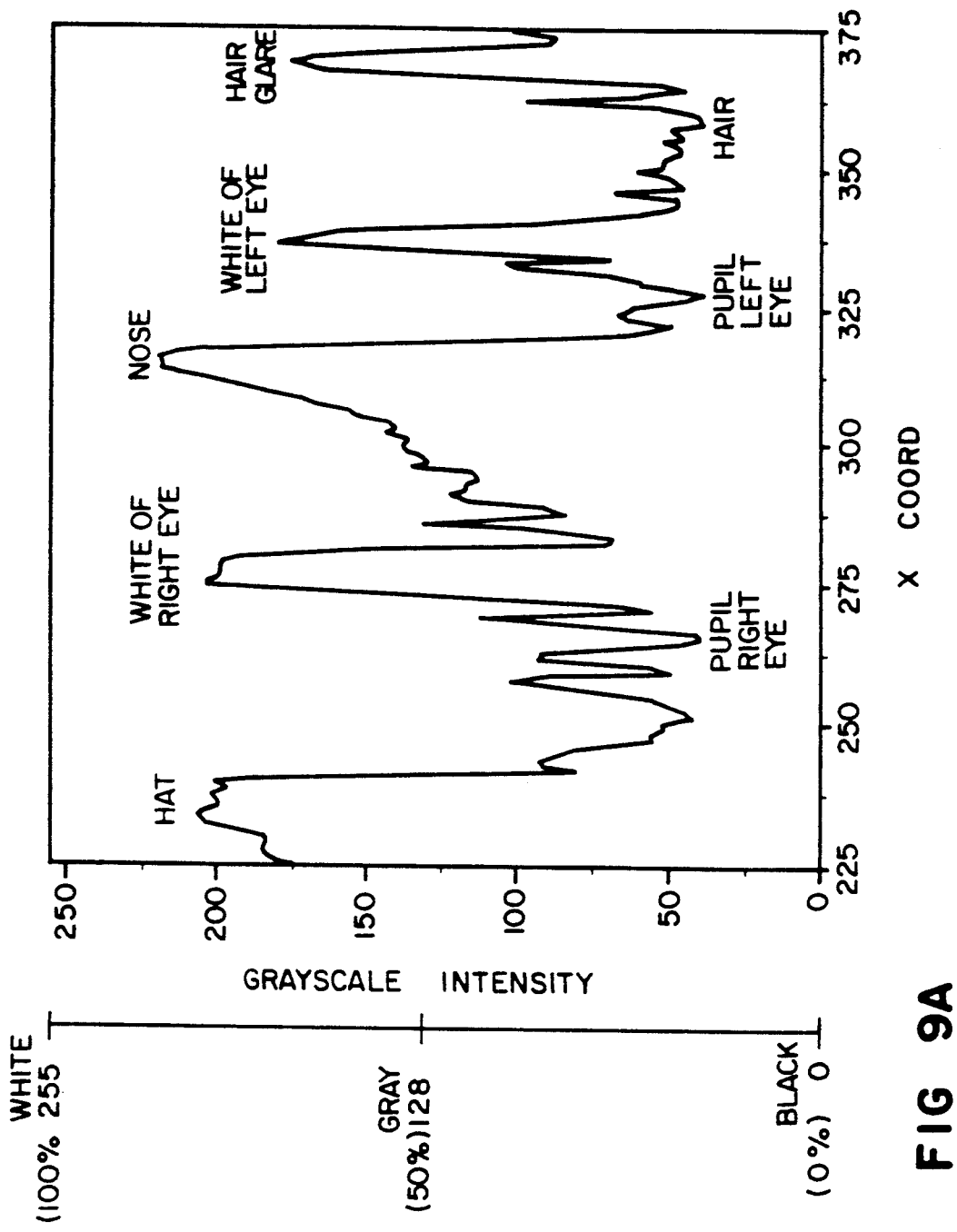
Figure 9B:
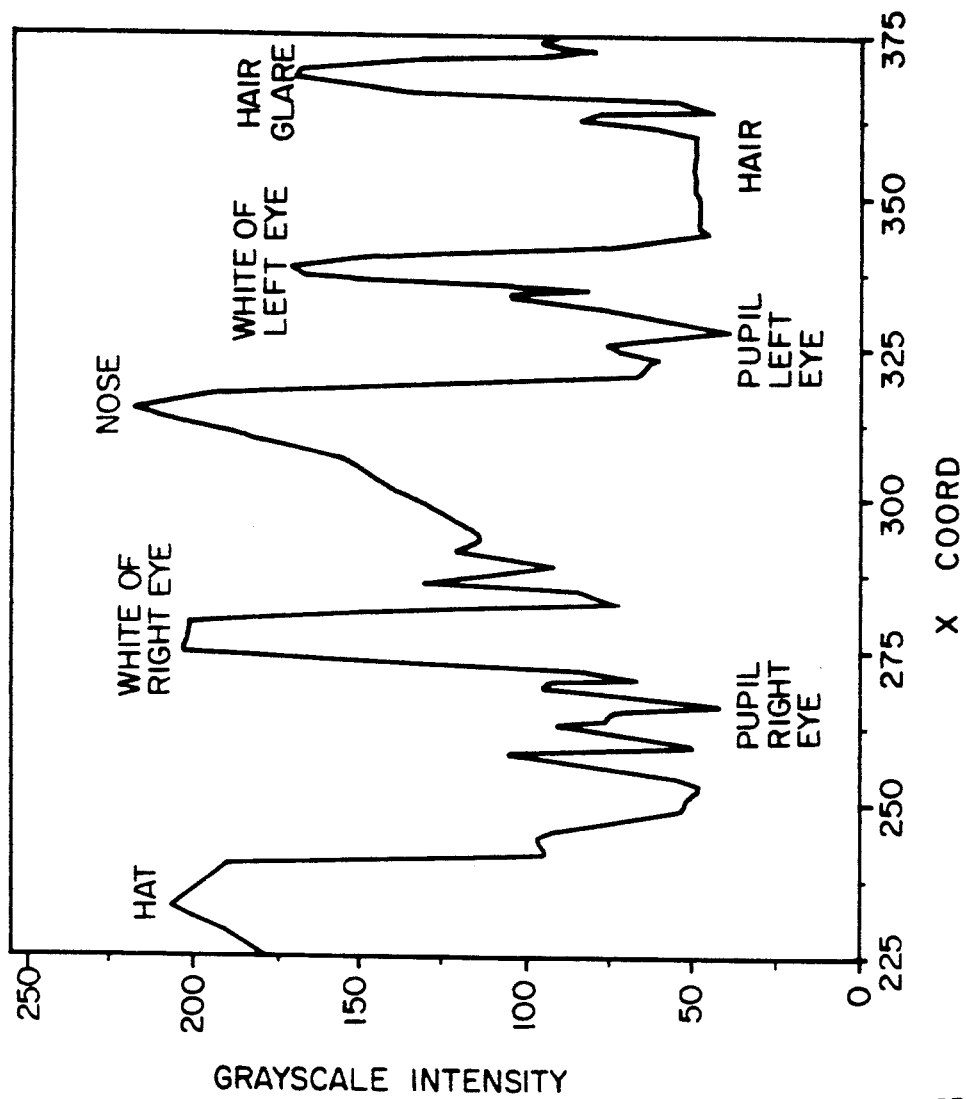
Figure 10:
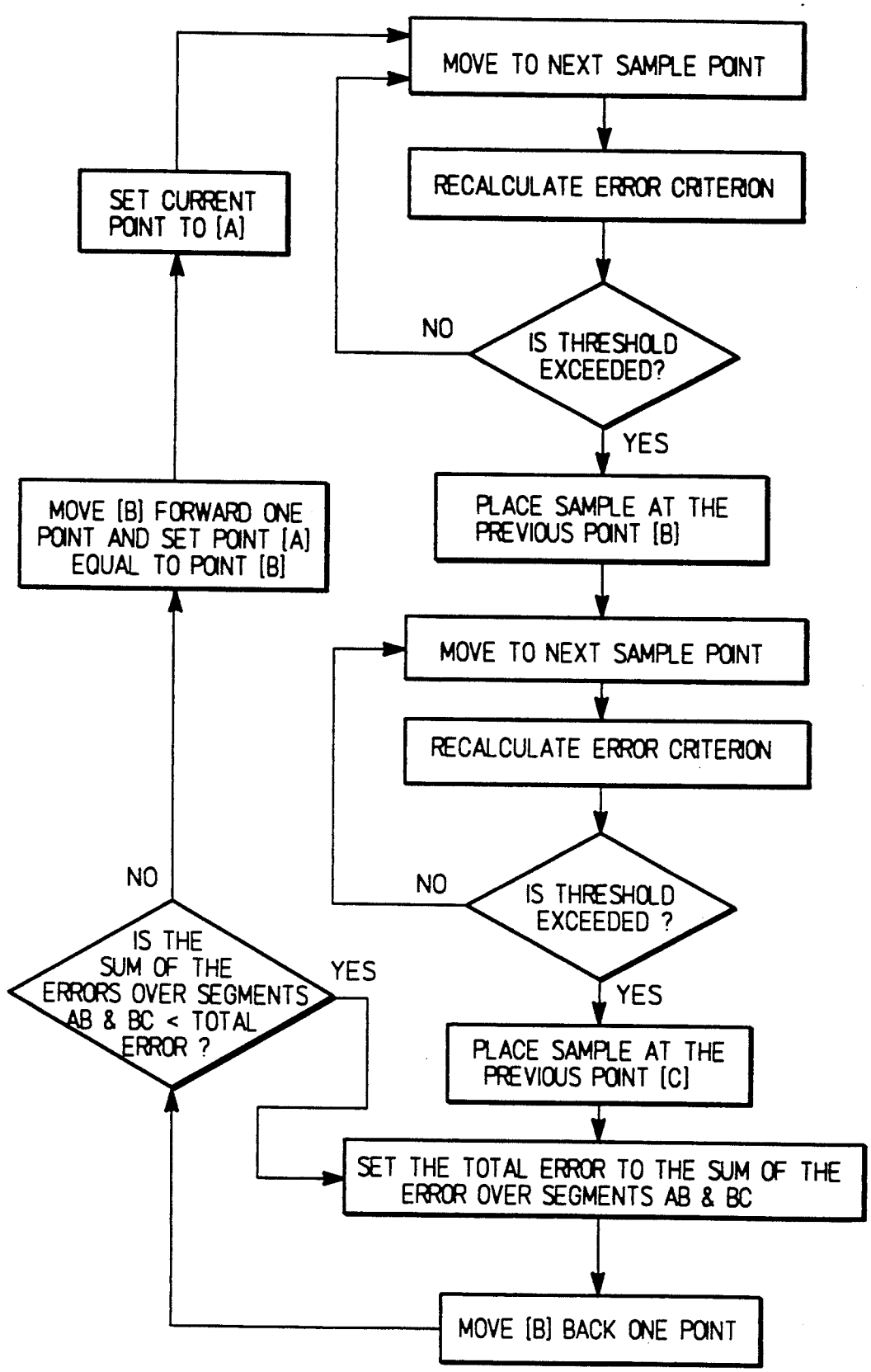
Figure 11:
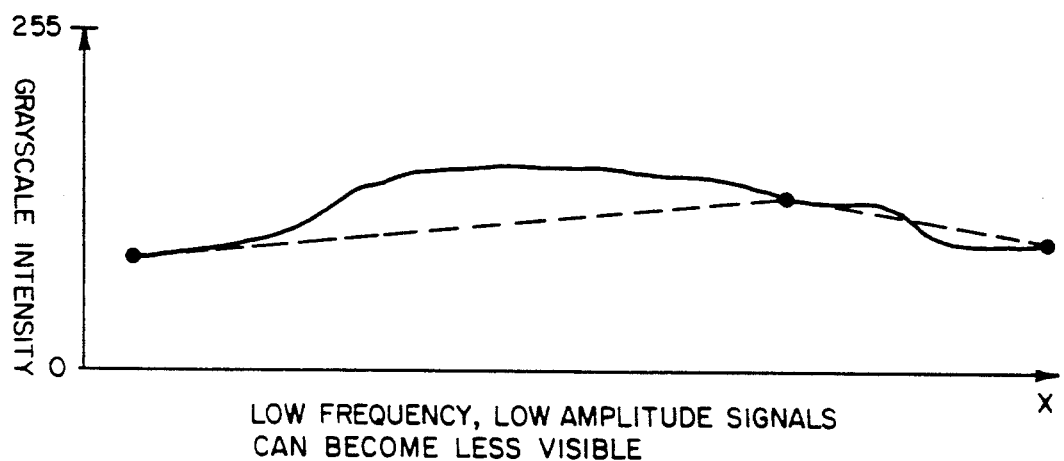
Figure 12A:
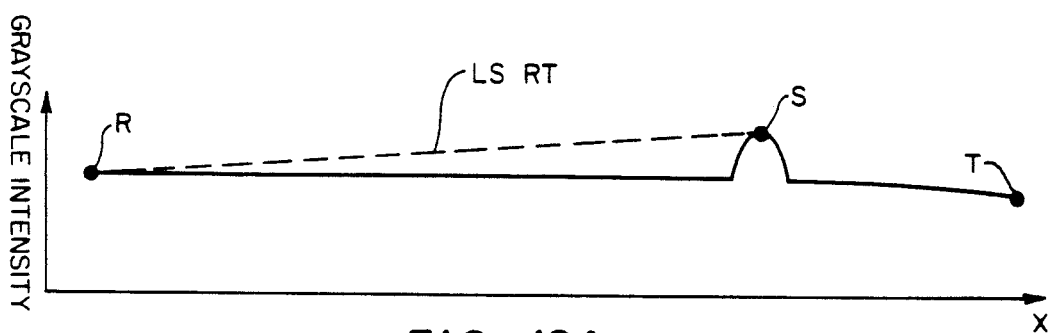
Figure 12B:
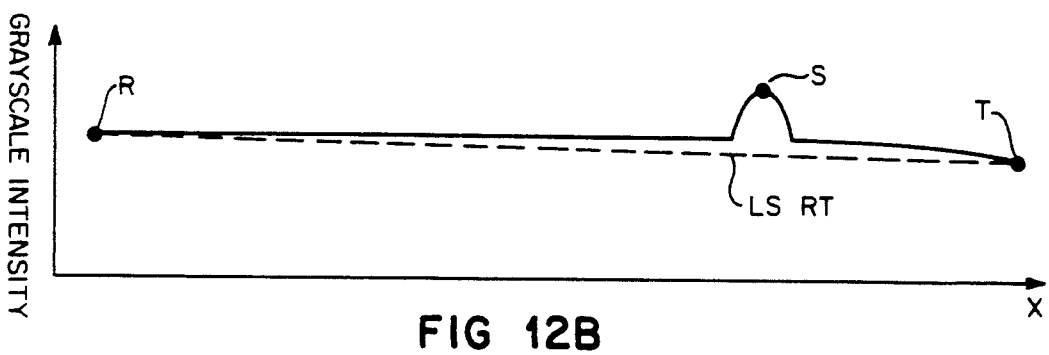

and rendered white if a corresponding sample point is selected;

FIGS. 8(a), 8(b) and 8(c) are photocopies of comparative computer-generated, enlarged images of the hat region of the Lena image of FIG. 6(a) using no compression, NSI compression according to the present invention, and DCT compression, respectively;

FIGS. 9(a) and 9(b) are comparative plots of gray-scale intensities for a particular scan line in FIG. 6(a) and in FIG. 6(b), respectively;

FIG. 10 is a flowchart of a sample point selection (or placement) process according to the present invention; and FIGS. 11(a) and 11(b) are diagrams illustrating look ahead optimization in which isolated sample points are caused to not be selected.

DETAILED DESCRIPTION OF THE PREFERRED EMBODIMENT

Overview

This invention provides a sample point jittering method for optimizing the placement of the sample points on an image to be sampled in order to reduce the uncompressed error.

Further, the invention provides a sample point lookahead method for minimizing the total number of sample points required without increasing the error above a maximum acceptable threshold error.

Another feature of the invention is that it provides for two dimensional extension of the inventive algorithm. The standard way to extend a one dimensional algorithm to two dimensions is by techniques like the Peano scan. The Peano scan does not work well for NSI because NSI uses one dimensional (1 D) linear interpolation for reconstruction of the image. This would cause spatially adjacent pixel intensity values to vary irregularly if a Peano scan were used. The technique used here is the processing of every nth scan line (e.g., 8th scan line) independently and then processing the pixels in between in a columnar fashion, as if each were a separate scan line.

Also provided is a method for generating partial sums for error criterion through the use of Eq. 3 below. Because the slope of the approximating line changes as the line is extended to each new sample point, it would seem that the sum of squared error criterion would have to be recalculated for all of the pixels on the line. As it turns out, only a small number of sums need be tracked during the process such that the entire calculation does not have to be redone with each new sample point.

The invention also provides an adaptive improved entropy encoder. Its major advantage is that it needs no special table to perform encoding or decoding.

The method for entropy encoding of run lengths means that the distances between the sample points themselves are entropy encoded. This is an important step in obtaining high compression rations.

Algorithm—Development

The algorithm introduced here remedies shortcomings of current image compression algorithms.

This inventive algorithm nonuniformly samples the image surface and interpolates the omitted samples points when decoding, hence the algorithm has been called nonuniform sampling and interpolation—(NSI). A one-dimensional linear interpolation function has been chosen here to keep decoder complexity low. Given this constraint, this algorithm was devised to choose the sample points on a scan line basis. Sample points are chosen such that the reconstructed image surface will be within a particular error bound of the original image.

Figure 1A:
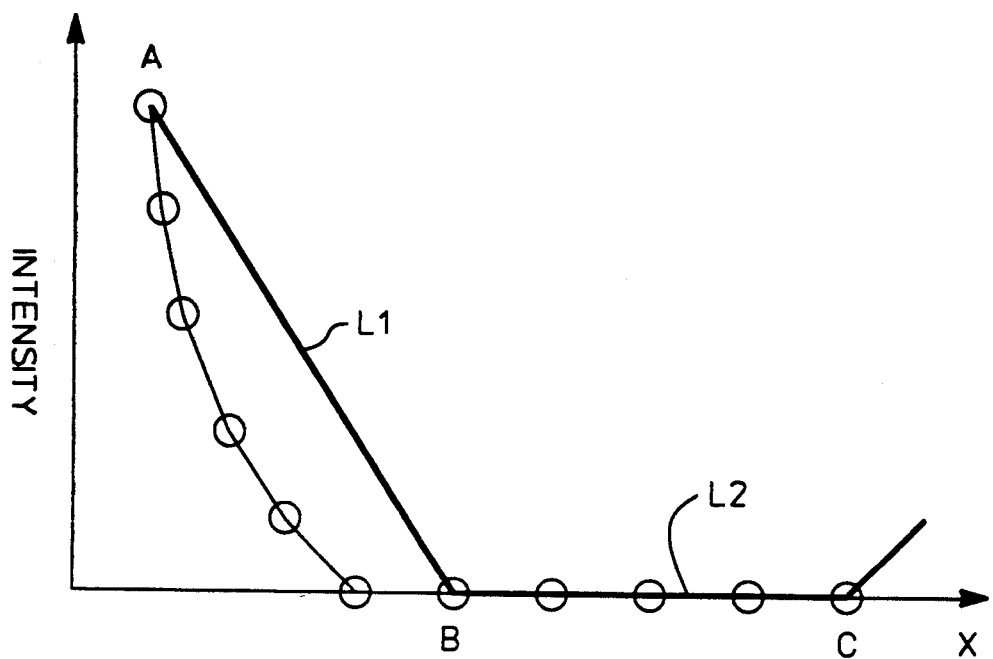
FIGS. 1(a) and 1(b) are diagrams illustrating sample point jittering in which sample points close to a selected sample point are tested and the selected sample point is replaced by one of the tested sample points when a total error in relation to an immediately preceding selected sample point and an immediately succeeding sample point is reduced.
Figure 1B:
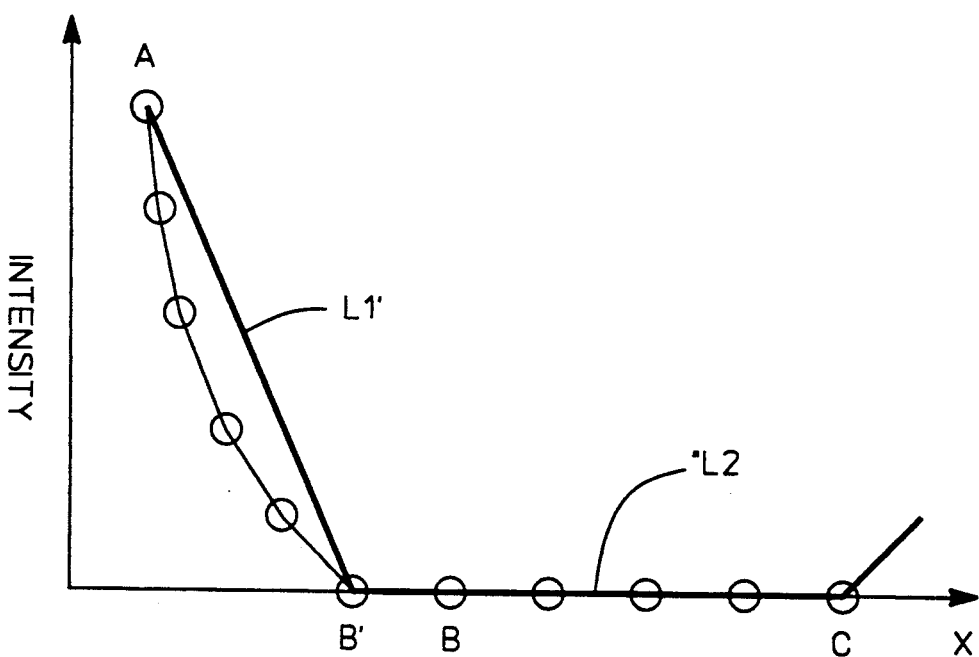

A start point for an approximating line is chosen—the first sample on each line is chosen—and the end point of the line is extended forward sample point by sample point until an error criterion threshold is exceeded. When this line is ended, a new line is started and the process repeats, as shown in FIGS. 1(a) and 1(b). The error criterion threshold may be changed as desired; if more error can be tolerated, less samples will be taken and greater compression is possible.

One error criterion evaluated was a traditional method of fine fitting, commonly called the cone intersection method. This method was devised by Sklansky and Gonzalez '80; the method uses the Hausdorff-Euclidean distance measure. This measure is the length of the radius of a circle centered on the original data point and tangent to the approximating line being considered. This criterion did not perform well in tests. A new error criterion and sample point placement optimization algorithm was devised.

A better performing criterion is the sum of squared differences (SOS) between the reconstructed data and the original data, as detailed in Equation (Eq.) 1, where: $\hat{I}_i$ is the interpolated intensity value for a pixel; $I_i$ is the original value; and the index i is an index across the line.

$$SOS = \sum_i (\hat{I}_i - I_i)^2 \qquad (Eq. 1)$$

Eq. 2 expresses $\hat{I}_i$ in terms of its linear interpolant, where m is the slope of the line and b is the intercept.

$$SOS = \sum_i (mi + b - I_i)^2 \qquad (Eq. 2)$$

Because the slope of the line changes as the line is extended, it would appear that this error criterion would need to be recalculated for each new sample point. This turns out not to be case, however, Eq. 2 can be expanded such that the terms involving the slope can be separated as in Eq. 3, where n is the total number of points in the line and i varies from 0 to (n−1).

$$SOS = m^2 \left( \sum_i i^2 \right) + 2mb \left( \sum_i i \right) + nb^2 - 2m \sum_i (I_i i) - 2b \left( \sum_i I_i \right) + \sum_i I_i^2 \qquad (Eq. 3)$$

Maintaining a small number of running sums allows this criterion to be calculated on a scan along basis even though the slope of the approximating line changes.

For purposes of illustration, the method of selecting sample points in such a way to allow intervening (non-selected) sample points to be interpolated without exceeding an error threshold will be explained in relation to the intensity waveform of FIG. 1(a) along which sample points P1–P13 are defined. The basic method of selecting sample points is shown in steps S1–S9 of FIG. 10. To begin, a first sample point P1 is selected, defining a beginning point A of a first approximating line segment. The counting variable i is set to zero such that the running sums in Eq. 3 are each reset to zero. The next sample point P2 is then examined, the running sums are updated with i=1, and the error criterion of Eq. 3 above is calculated with n=2 and values of m and b determined by the line segment E1 joining points P1 and P2. Since there are no intervening sample points between sample points P1 and P2, the sum-of-squares error is zero such that the error threshold is clearly not exceeded. Sample point P3 is then examined, the running sums are updated with i=2, and the error is calculated with n=3 and values of m and b determined by the line segment E2 joining points P1 and P3. If the error threshold is not exceeded, P4 is examined, and operation continues in this fashion until the error threshold is exceeded, assumed in this example to be when point P6 is examined. Table 1 below gives an idea of how the running sums may be kept and the error calculated.

TABLE 1

| i | $i^2$ | n(=i+1) | $I_i$ | $I_i i$ | $I_i^2$ |
|---|---|---|---|---|---|
| 0 | 0 | 1 | $I_0$ | 0 | $I_0^2$ |
| 1 | 1 | 2 | $I_0 + I_1$ | $I_1$ | $I_0^2 + I_1^2$ |
| 2 | 4 | 3 | $I_0 + I_1 + I_2$ | $I_1 + 2I_2$ | $I_0^2 + I_1^2 + I_2^2$ |
| • | • | • | • | • | • |
| • | • | • | • | • | • |
| X | • | • | • | • | • |
|   | 2mb | $m^2$ | $b^2$ | $-2b$ | $-2m$ | 1 |
| + |   |   |   |   |   | ERROR |

When the error threshold has been exceeded, the previous point, in this case point P5, is selected as the end point B of a line segment LS1 from A to B. Point B is then used as the first sample point to determine a next line segment LS2=BC, etc. As a result sample points P1-P13 are represented by line segments LS1, LS2 and LS3 extending between selected sample points A, B, C and D. The total error of the approximating line segments LS1 and LS2 in FIG. 1(a) is not minimized but may be minimized by a process of sample point jittering explained more fully below in connection with steps S10-S13 of FIG. 10, the results of which are shown in FIG. 1(b).

Once the samples are chosen, the image is stored as a set of samples and the distance between them, in a manner very similar to run length encoding. To obtain high compression ratios, the distance between these samples may be Huffman coded.

Figures 1C, 1D:
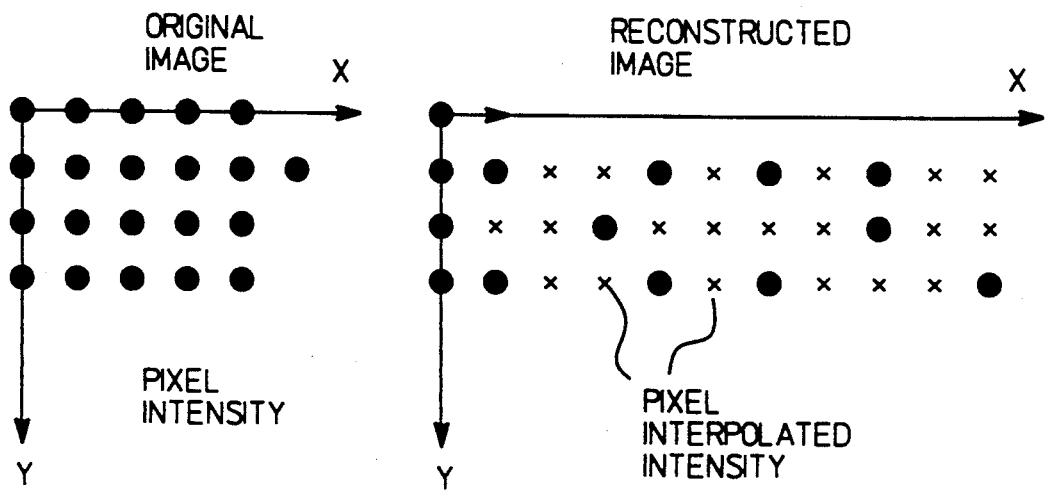
FIG. 1(c) is a diagram of a representation of an original image as intensity values associated with an array of sample points uniformly distributed in an XY coordinate system logically superimposed on the image.
FIG. 1(d) is a diagram of a compressed representation of the original image of FIG. 1(c) in which the intensities of non-selected sample points are interpolated from the intensities of selected sample points.
Figure 1E:
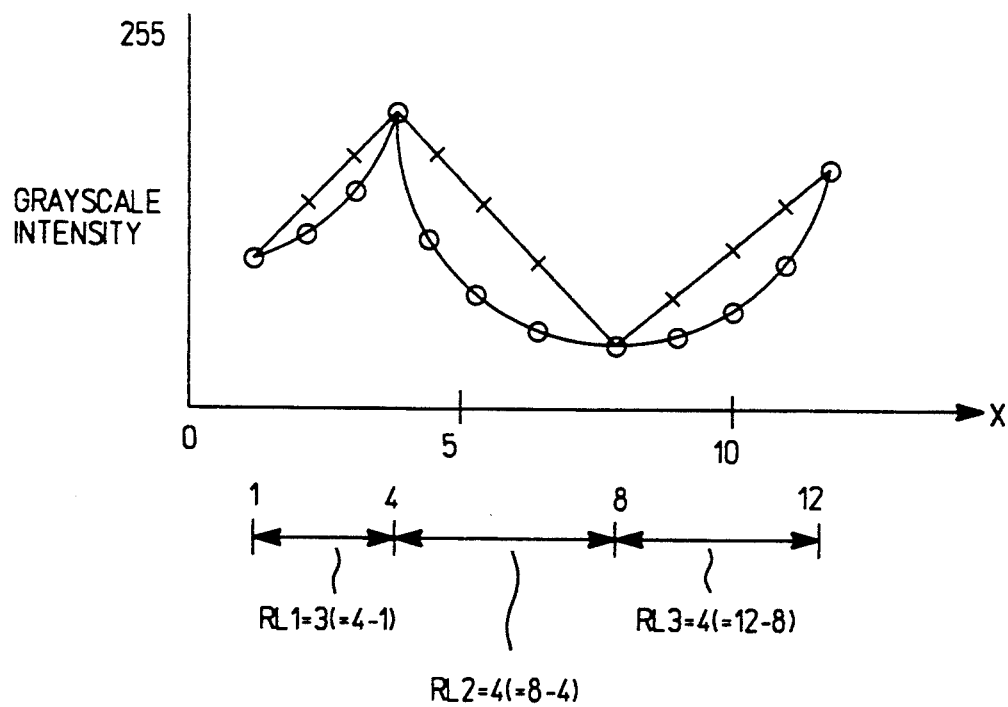
FIG. 1(e) is a diagram illustrating entropy encoding in which distances between selected sample points are represented in terms of run lengths.

The manner in which the image is stored may be appreciated with reference to FIGS. 1(c) 1(d) and 1(e). Originally, the image is represented by actual measured grayscale intensity values for each pixel in an XY coordinate system as seen in FIG. 1(c). By the sample point placement process previously described in relation to FIG. 1(a), certain sample points are selected to gave their intensities stored and intervening sample points have their intensities interpolated as seen in FIG. 1(d) in which selected sample points are indicated by dots and interpolated sample points are represented by "X"s. In addition to the intensity values of the selected sample points, distances between the selected points, measured in numbers of sample points, or "run lenths", are also stored as shown in FIG. 1(e). In FIG. 1(e), an intensity waveform having 12 total sample points is approximated by line segments joining sample points 1, 4, 8 and 12. The run lengths of the line segments are therefore 3, 4 and 4, respectively.

During the investigation leading to the invention of this algorithm, the inventor realized that the distribution of these distances (that is, the run lengths) was such that an alternate, faster, entropy encoding compression algorithm can be used (faster, for example, than the well-known Huffman method). This inventive algorithm varies the number of bits per run length adaptively. The number of bits used to store the upcoming run length is equal to the minimum number of bits needed to encode the previous run length.

A run length of all ones indicates that the upcoming run length is too large to be represented in the current number of bits. In this case, information follows as to how many bits are needed then the run length value itself follows. Performance was found to be slightly worse than modified Huffman coding but considered to be within an acceptable bound.

This inventive adaptive algorithm offers the advantage that is only requires one pass through the data during encoding and does not required any table look up operations during decoding. This choice was made intentionally by the inventor to speed decoding.

Decompression of the data is a simple matter. Sample data are positioned in the reconstructed image and omitted pixel data is approximated by linear interpolation between adjacent samples.

The algorithm presented thus far is scan line in nature and therefore has certain inherent deficiencies. One is that is does not take advantage of the two dimensional nature of the image data. Another is that is generates unacceptable horizontal stripes in the reconstructed image because each of the scan lines is processed independently.

Figure 2:
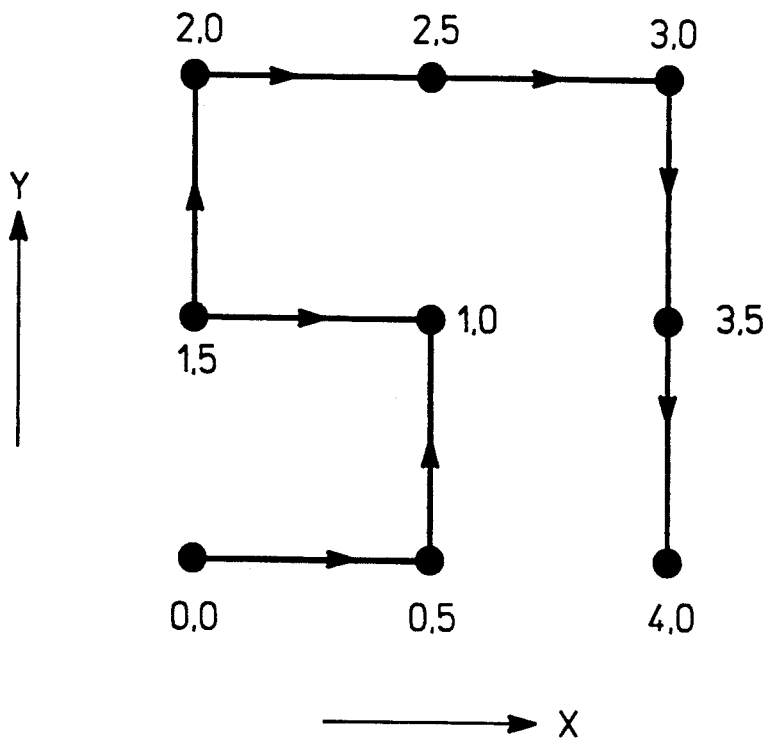
FIG. 2 is a diagram of a known Peano scan technique.

Alternate scanning techniques such as the Peano scan, Bially '69, have been suggested as means of extending one dimensional processing techniques to handle two dimensional data. These techniques do not behave correctly when used in conjunction with 1 D linear interpolation as illustrated in FIG. 2. For a given slope interpolating the intensity waveform, the nature of the Peano scan causes the intensities of the interpolated pixels to vary in an undesirable manner. In FIG. 2, the slope is 0.5.

Figure 3:
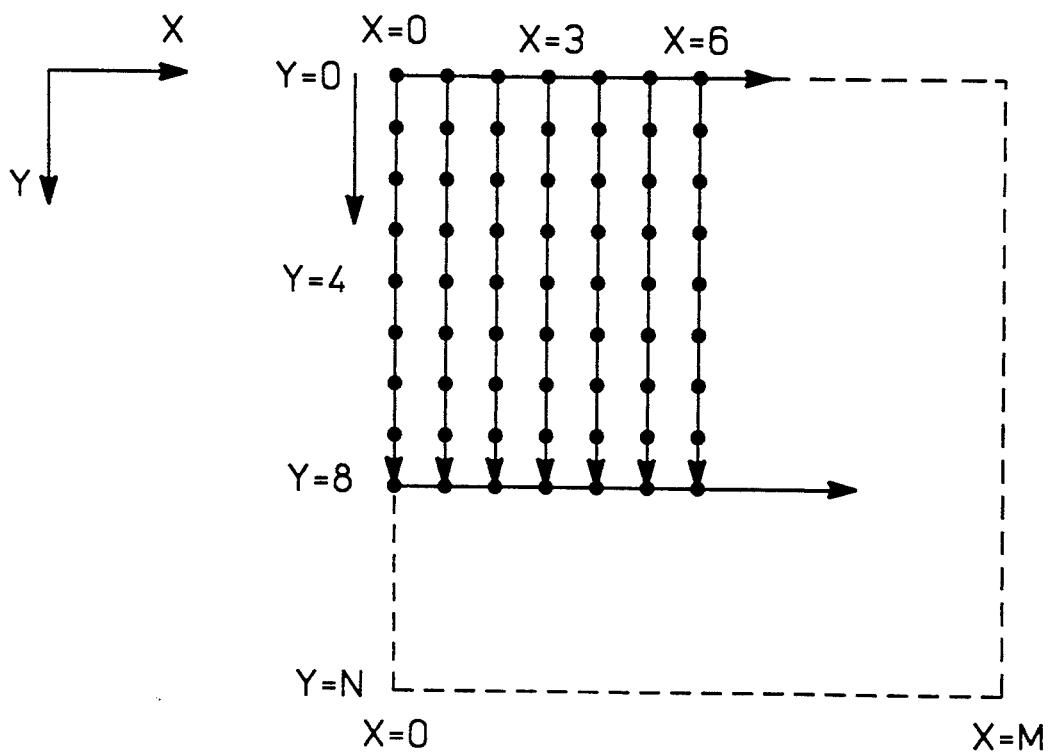
FIG. 3 is a diagram of an improved scan technique for purposes of the present invention.

A feasible solution in this situation is to process every eighth scan line (the number eight was determined experimentally) using the scan line algorithm outlined so far. The pixels between these scan lines are then processed in a columnar fashion, as if each is a new scale line, as illustrated in FIG. 3. Each of these columns is processed such that all of the pixels in each column fall within the error criterion threshold. Additional samples can be taken from these columns according to the algorithmic process detailed previously.

Algorithm—Results

For evaluation purposes, speed and quality of this inventive NSI technique are compared to a non-adaptive DCT technique.

Speed. During data compression using the algorithm proposed by Makhoul '80, the DCT of an n×n block requires $[2n^2 \log_2 n]$ real multiplications and the same number of real additions. To reduce the computational load, most DCT implementations divide an image into 8×8 subblocks and process each of these subblocks independently. By the previous formula appearing earlier in this paragraph, this translates into 6 multiplies and 6 additions per pixel.

By comparison, the scan along version of NSI invented here requires approximately 20 multiplications and 20 additions per pixel; this assumes that the error criterion will have to be calculated twice for each pixel because of the sample point placement optimization procedure.

During data decompression (data expansion of the stored compressed data), DCT decompression requires the same amount of computation as DCT compression requires because DCT must perform the inverse transform. In contrast, this inventive NSI is much faster when decoding or decompressing the encoded data; NSI requires on average (1) [1/c] divides per pixel where c is the compression rate, which is 8:1 for this example, to calculate the slope to interpolate the omitted pixels, and (2) 1 addition per pixel to generate the interpolated values.

These numbers in the previous paragraph are dependent on the compression rate because the fewer the number of samples that are retained, the longer the interpolated strip will be, which allows more of the processing to be distributed over a greater number of pixels. Entropy encoding/decoding of the run lengths for NSI and the coefficients for the DCT are not included in these calculations because they are considered to be comparable in complexity.

Comparing these two (that is, NSI vs. non-adaptive DCT) algorithms' speeds—based on the number of multiplies per pixel at an 8:1 compression rate—shows the 8×8 DCT to be 33 times faster than NSI at compression time and 48 times slower than NSI at decompression time.

In contrast, a "C" computer language version of the NSI decoder, using fixed point arithmetic, was implemented and executed on a UNIX workstation (as HP 9000 series 320 having a 16.6 MHz 68020 microprocessor). Complete decode (that is, decompression) time for a 512×512, 8 bit per pixel image compressed at 8:1, including entropy decoding of the run lengths, occupied approximately 3 seconds of CPU (central processing unit) time.

Quality. Quality was also investigated. Both NSI and the DCT were tested on three images: the classic head and shoulder images Lena and Tiffany and also a section of a scanned magazine page which included both greyscale and text.

Quality was measured in terms of distortion, calculated as the signal to noise ratio (SNR) in decibels as described by Pratt '78 and in Eq. 4. In Eq. 4: the peak value of the signal is assumed to be 255; N is the total number of pixels in the image, $\hat{I}_{xy}$, is the reconstructed pixel value, and $I_{xy}$ is the original pixel value.

$$SNR = 10 \log \frac{255^2}{\frac{1}{N} \sum_y \sum_x (\hat{I}_{xy} - I_{xy})^2} \quad \text{(Eq. 4)}$$

Figure 4:
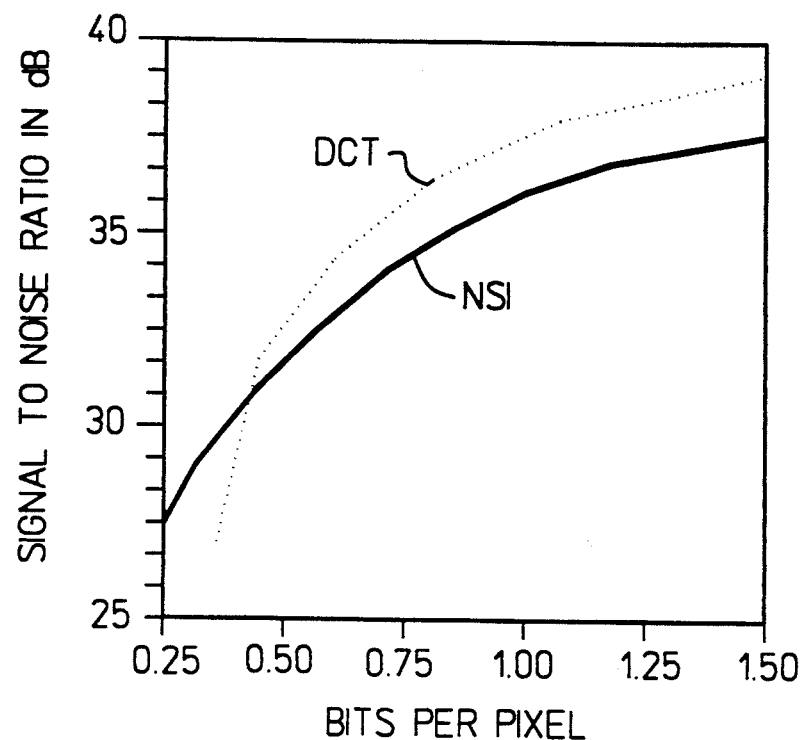
FIG. 4 is a graph comparing the signal-to-noise ratio achieved by the NSI image compression method of the present invention with the signal-to-noise ratio of a DCT image compression technique.

Collecting this statistic over a range of compression rates allows a rate-distortion curve to be generated as shown in FIG. 4. In FIG. 4 the compression rate ii shown on the horizontal x-axis in units of buts per pixel; the distortion or signal-to-noise ratio (SNR) is shown on the vertical y-axis in units of decibels (dB).

FIG. 4 shows curves for the DCT and NSI for the 512×512 8 bit per pixel greyscale Lena image. Compression ratios are reported in terms of bits per pixel. As the rate-distortion curves in FIG. 4 show, the NSI algorithm compares favorably to a non-adaptive DCT, with NSI being at its worst 2.5 dB poorer. At the 8:1 compression rate the DCT had a reconstructed SNR of 37.5 dB, while NSI had an SNR of 35.6 dB.

Figure 5:
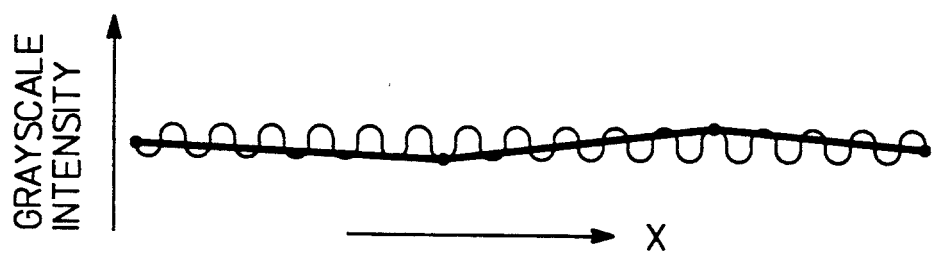
FIGS. 5(a) and 5(b) are diagrams of intensity waveforms that results in a sub-optimal representation according to the NSI image compression method of the present invention.

Part of the distortion shown in FIG. 4 is caused by high frequency, low amplitude waveforms as shown in FIG. 5(a). A high frequency, low amplitude intensity waveform causes the NSI techniques to vary line slopes in relative flat regions, making brightness uneven in the reconstructed waveform. In addition, low frequency, low amplitude signals can become less visible as shown in FIG. 5(b).

Figure 7A:
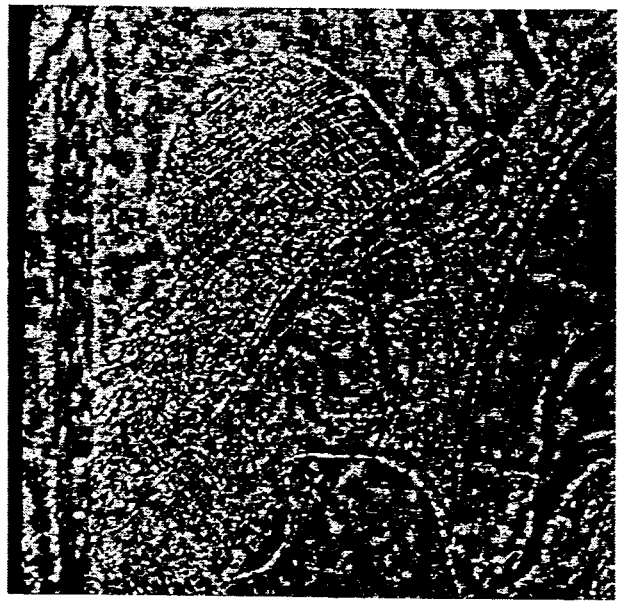
FIG. 7(a) is a photocopy of a computer-generated image composed of samples points having intensities proportional to intensity differences between corresponding sample points in FIGS. 6(a) and 6(b)
Figure 7B:
FIG. 7(b) is a photocopy of a black-and-white computer-generated image composed of sample points rendered black if a corresponding sample point is not selected during compression of the image of FIG. 6(a)

An example of the effects of the foregoing sources of distortion may be observed with reference to FIGS. 6(a) and 6(b). FIG. 6(a) shows the original Lena image; FIG. 6(b) shown a NSI compressed and reconstructed version of the image at an 8:1 compression ratio. Differences between the original image and the reconstructed image are shown in FIG. 7(a). White areas indicate a positive error; black areas indicate a negative error. Differences between original vs. reconstructed images were scaled (enlarged) by a factor of eight so that image detailed would be visible. FIG. 7(b) shows the positions of the sample points—shown as white dots—which are retained by the NSI scheme.

As can be seen in FIGS. 6 and 7, the above analysis regarding Eq. 4 and FIG. 4 does not fully characterized all distortions introduced by the SNI algorithm. NSI does, in fact, introduce some distinctive features or distortions into the image. For detailed comparison, FIGS. 8(a), 8(b), and 8(c) show enlarged views of the hat region 8—8 of FIG. 6. FIG. 8(a) is the original, FIG. 8(b) is the NSI rendition, and FIG. 8(c) is the DCT rendition at the same (8:1) compression ratio.

A first distortion appears as visible "banding" in the image. This "banding" occurs because with NSI every eighth scan line is processed independently.

A second distortion has to do with texture. As explained in reference to FIG. 5(a), NSI does not perform well in sections of an image where the signal has a high frequency and a low amplitude, such as with the more heavily textured regions appearing in the hat in FIG. 6. This "texture" distortion appears because the variations in the intensity waveform cause adjacent line segments to exhibit small variations in slope. However, these slope variations are not large enough to require a new segment for each peak. In these textured regions (areas of the hat appearing in FIG. 6–8) smearing or aliasing noise is visible. This smearing or aliasing noise effect can be seen in FIG. 8(b).

A third artifact or distortion attributable to NSI arises from low contrast. As explained in reference to FIG. 5(b), low contrast details may fade from the reconstructed image, as is the case for some of the radial arms of the semicircle produced on the right side of the image in FIGS. 6(a) and 6(b).

FIG. 9 compares the actual grayscale intensity waveform along a scanline—in this case along scanline 266 shown in FIG. 6—in FIG. 9(a) to the interpolated grayscale waveform generated according to the algorithm of Eq. 3 in FIG. 9(b). Comparison of the two intensity waveforms reveals that small intensity excursions in the original waveform are lost in the compressed and reconstructed waveform.

Algorithm-Improvements

Sample Point Jittering

Algorithms which process an image scan line by scan line tend to exhibit a smearing of edges in the direction of the scan line processing. This is caused by a sample point being placed slightly after an edge, instead of directly on it, as illustrated in FIG. 1(a). In FIG. 1(a), point B (P5) is placed one sample point after an edge represented by a vertical line passing through point P4. A method that optimizes sample point placement, called "sample point jittering," can overcome this problem. Once a sample point is chosen, the position of the previously chosen sample point is moved back to a position such that the total of the two sum of squared differences for the current line segment and the previous line segment is minimized, as in FIG. 1(b). The method whereby this is accomplished may be appreciated with reference to steps S10-S13 of FIG. 10. Once points A, B and C have been determined as shown in FIG. 1(a), an error total is set to the sum of the errors over line segments AB and BC. Point B is then moved back one point to point P4, and the resoluting total error is recalculated. So long as the total error is decreasing, point B is repeatedly moved back one point. Once the total error is determined not to have decreased as a result of the last adjustment, point B is moved forward one point to the last point that did cause the total error to decrease.

Look Ahead

Another problem encountered in redundancy reduction algorithms is that image noise can cause the error criterion to place a sample point unnecessarily. A look ahead procedure can overcome this by extending the current line to a future sample point which allows the interpolated region to be approximated within the error criterion threshold. The effect of look ahead optimization is shown in FIGS. 11(a) and 11(b). In FIG. 11(a), a small isolated intensity waveform excursion causes the error threshold to be exceeded and a sample point S to be placed as the end point of a line segment RS even though the waveform could be represented by a longer line segment RT with the same overall error. Instead, the current line may be extended to see if the approximation will re-enter the bounds defined by the error threshold, and if so, the previous sample point may be discarded. Look ahead may be performed some number of sample points n ahead such that the error threshold is required to have been exceeded for n consecutive sample points before selecting a sample point just preceding a sample point that first caused the error threshold to be exceeded.

The Claims define the invention. This Detailed Description and related Drawings provide a few specific examples of how to practice the invention. Although these examples set forth the best mode considered by the inventor for practicing the invention, many other specific examples can be devised by those skilled in that art that, though they differ from these examples here, would still fall within the definition of the claimed invention. Therefore the definition of the invention and the breadth of its scope can only be had from an expansive reading of the appended Claims.

The invention claimed is:

1. A method of characterizing and storing a physical image comprising a combination of individual physical impressions as a subset of corresponding sample points comprising the steps of:

coupling an optical scanner to a computer to superimpose a Cartesian coordinate system having a plurality of uniformly distributed coordinates on an image;

scanning an image to produce a plurality of sample points, each of the plurality of sample points uniquely corresponding to one of the plurality of uniformly distributed coordinates and having an associated intensity value;

converting the intensity values of the plurality of sample points into a binary representation;

separating the plurality of sample points into data subsets wherein each subset contains the sample points of the same row or column of the ordinal image, each data subset corresponding to a scanned image line;

establishing a fitting criterion corresponding to the scanned image lines;

setting an error threshold corresponding to a lowest acceptable resolution in terms of the fitting criterion;

tagging an initial point and a final point from each data subset;

sequentially testing each data subset, by analyzing for each data subset beginning with the initial point and ending with the final point in the data subset under test, said step of analyzing comprising:

projecting interpolated intensity values using the fitting criterion on a tagged sample point and two successive sample points such that together with said initial sample point defines a line or other curve, comparing a difference between said interpolated intensity values with a corresponding original image intensity values with the error threshold, tagging the first successive sample point when the error threshold is exceeded, determining the next two successive sample points, repeating said step of analyzing until the final point in the data subset is reached; and storing in retrievable form intensity values of said tagged sample points, whereby said projected image line is represented in compressed binary form.

2. The method of claim 1 wherein every Nth row of sample points constitutes a data subset.

3. The method of claim 2 wherein for each column of sample points, sample points between successive ones of said every Nth row of sample points together constitute a data subset.

4. The method of claim 1, comprising the further step of, for every selected sample point besides said initial sample point and said final sample point, testing sample points close in said order to said selected point and replacing said selected point by one of said sample points tested when said one of said sample points, as compared to said selected sample point, reduces a total error in relation to an immediately preceding selected sample point and an immediately succeeding sample point as measured according to said error criterion.

5. The method of claim 1, wherein said storing step further includes storing in addition to said intensity values distances, measured in numbers of sample points, between said selected sample points.

6. The method of claim 5, wherein said distances are entropy encoded by, in general, using to store a particular distance a number of bits equal to a minimum number of bits needed to store a previous distance.

7. The method of claim 6 wherein, when said minimum number of bits is insufficient to store said particular distance, said minimum number of bits are stored all as is followed by information as to how many bits are needed to store said particular distance, followed in turn by said particular distance stored in the needed number of bits.

8. The method of claim 1, wherein said error criterion is a sum of squares error criterion and is calculated using the equation $$SOS = m^2 \left( \sum_i i^2 \right) + 2mb \left( \sum_i i \right) + nb^2 - 2m \sum_i (I_i i) - 2b \left( \sum_i I_i \right) + \sum_i I_i^2 \quad \text{(Eq. 3)}$$

where m and b are the slope and intercept, respectively, of said line i is an index value, $I_i$ is the intensity of a sample point identified by said index value, and n is a total number of sample points in said line.

* * * * *